UNITED STATES PATENT OFFICE.

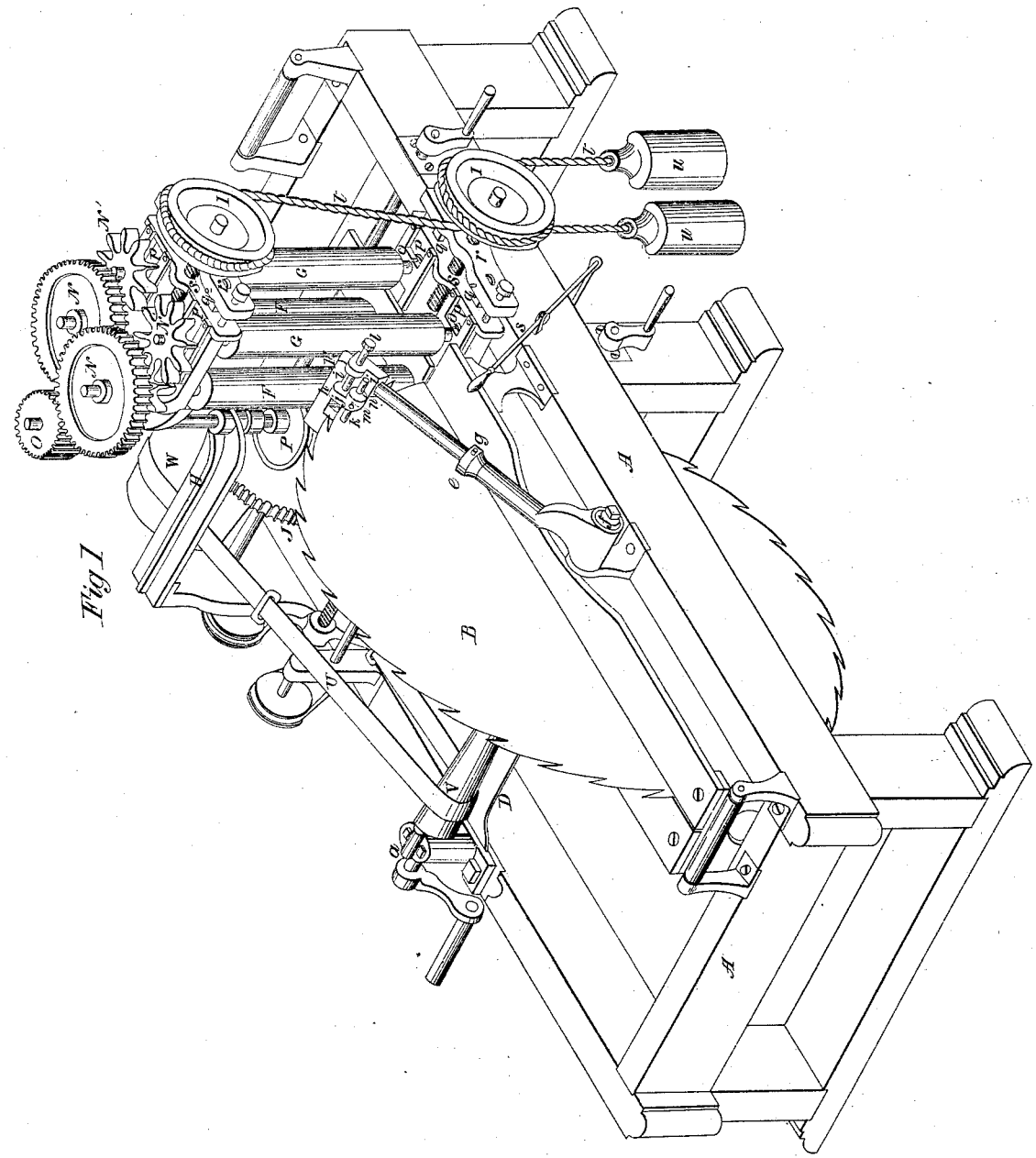

JOHN J. SQUIRE, OF ST. LOUIS, MISSOURI.

SAWING-MACHINE.

Specification of Letters Patent No. 11,813, dated October 17, 1854.

*To all whom it may concern:*

Be it known that I, JOHN J. SQUIRE, of St. Louis, State of Missouri, have invented certain new and useful Improvements in Sawing-Machines for Resawing; and I do hereby declare that the following is a full, clear, and exact description of the construction and operation of the same, reference being had to the annexed drawings, making a part of this specification, in which—

Figure 1, is a perspective view of my improved machine. Fig. 2, is a side elevation of ditto. Fig. 3, is an end view of ditto in elevation. Fig. 4, is a plan or top view of ditto. Fig. 5, is a longitudinal vertical section of the feed roller frame, the plane of section being through the center. Fig. 6, is a transverse section of the lower plate of the feed roller frame and bed plate. Fig. 7, is a plan and sectional view of saw guide. Fig. 8, shows two of the feed roller boxes—a top and side view.

Similar letters of reference indicate corresponding parts in the several figures.

The nature of my invention consists: 1st, in the employment or use of a radius guide, E constructed and applied to the saw, as will hereafter be shown, for the purpose of controlling and guiding it as it enters the stuff to be sawed, and also insuring a true movement of the saw, and preventing any vibration of the same.

2d, my invention consists in the employment or use of feed rollers F F G G placed within a sliding frame H, and arranged as will be hereafter shown, for the purpose of gaging the stuff to be sawed, and properly presenting said stuff to the saw, and also properly guiding it while being sawed.

To enable others skilled in the art to make and use my invention, I will proceed to describe its construction and operation.

A, is the frame of the machine, constructed in any proper manner, so as to support the working parts.

B, Figs. 1, 2, 3, and 4, is a circular saw, hung upon a mandrel, C, which works in suitable bearings, ($a$), ($a$), said bearings resting upon ways, ($b$), ($b$), on the upper part of the frame, A, see Fig. 4, a way, ($b$), being upon each piece of the frame. The bearings, ($a$), ($a$), are connected together by a cross plate, D, shown in Figs. 1 and 4, the bearings and cross plate forming an adjustable frame, in which the saw mandrel, C, is hung. The saw, B, is perfectly straight or even on the "line side," but a portion of the opposite side is beveled as shown in Figs. 3 and 4, viz: from ($c$), to ($d$), is a true taper, the other portion is parallel with the "line," or opposite side.

E, is a radius guide attached to the outer end of an adjustable arm, ($e$), the inner end of said arm being hung on an arm, ($f$), in line with the saw mandrel, C, see particularly, Figs. 1, 2, and 4. The arm, ($e$), is formed of two parts, the lower part being a socket, in which the upper part slides, and is secured at any desired point by a set screw, ($g$). The guide, E, is formed of a stock, ($h$), which passes over the teeth of the saw, B, the stock being provided with dove tailed ledges, ($i$), ($i$), between which a slide, ($j$), is fitted, said slide having pins, ($k$), ($k$), at both of its ends which are at opposite sides of the saw, and nearly in contact with it, see Fig. 1, and more particularly, Figs. 4 and 7. The slide, ($j$), is operated by a thumb screw, ($l$), and the pins, ($k$), are adjusted by means of set screws, ($m$), ($m$), which pass through sockets, ($n$), ($n$), in which the pins, ($k$), are fitted.

F, F, G, G, are vertical feed rollers placed in a movable or sliding frame, H, the rollers, F, are permanently attached to the frame, H, and have no movement independently of it, except their rotary motion, while the rollers, G, G, are fitted in boxes, ($o$), ($o$), which work in grooves, ($p$), ($p$), on the upper and lower parts of the frame, H, said boxes being attached by arms, ($g$), to cross heads, ($r$), ($r$), through which screws, ($s$), pass, said screws having pulleys, I, I, on their outer ends, around which pulleys, chains ($t$), ($t$), pass, having weights, ($u$), ($u$), at their ends, see Figs. 1, 2, 3, 4, and 5, the chains and weights being omitted in Fig. 5. The boxes are shown detached in Fig. 8, one being a top view, and the other, a side view.

The frame, H, may be moved in a direction transversely of the frame, A, and its bottom plate, J, shown in Figs. 2, 3, 4, 5, and 6, is provided with ledges, ($v$), ($v$), which rest or fit between guides, ($w$), ($w$), upon a bed plate, K, attached transversely to the upper part of the frame, A, shown in Figs. 5 and 6. The frame, H, may be moved when necessary, by means of a screw, L, which passes through a lug or projection, M, at one side of the bed plate, K, and through one of the side pieces of the frame, see Figs. 3, 4, and 5. The bed plate, K, is secured at one end on the upper part of the frame, A, by screws, $(x)$, $(x)$, and at the opposite end by a joint or hinge, $(y)$, shown clearly in Fig. 5, whereby the frame, H, may be inclined, when desired, for the purpose of sawing the stuff in a beveled or taper form.

The feed rollers are operated by means of horizontal gear wheels, N, attached to the upper ends of the rollers, the wheels, N, gearing in a pinion, O, on the upper end of an upright shaft which is provided with a bevel wheel, P, which gears into bevel pinions, Q, Q, placed loosely on a shaft, R, said pinions, Q, being thrown either one of them in gear with the wheel, P, by means of a lever, S, which operates a clutch, T, see more particularly, Fig. 3. Underneath the wheels, N, are pinions, N', which gear into each other, and communicate motion to the outer rollers, G, G. Motion is communicated to the feed rollers, F, F, G, G, by means of a belt, U, which passes around a pulley, V, on the saw mandrel and around a pulley, W, on a shaft, X, running in suitable bearings on the frame, H.

By having the saw mandrel hung in a movable or sliding frame, I am enabled to use saws of various sizes, and also adjust the saw in use, as it becomes worn.

By th use of the radius guide, E, the saw is prevented from vibrating, and it controls and governs the saw as it enters the stuff to be sawed, and causes it to work in a straight line, the pins, $(k)$, $(k)$, nearly touching the saw.

By means of the feed rollers, F, F, G, G, arranged within a frame, H, as described, the stuff will be fed properly to the saw, the outer rollers, G, G, adjusting themselves to the thickness of the stuff by means of the weights, $(u)$, $(u)$, which keep them pressed firmly against the stuff. The stuff may also be sawed obliquely, by raising one side of the bed plate, K, and throwing the feed rollers angularly with the saw, as shown by the red dotted lines in Fig. 5.

The stuff to be sawed is fed between the rollers, F, F, and G, G, to the saw, the radius guide, E, resting upon the stuff.

I do not claim constructing a saw with a beveled or taper side, for they have been previously used, and strengthening thin saws by this means, or by securing plates to them, is well known; neither do I claim the feed rollers, F, F, G, G, irrespective of their arrangement and connection with the frame, H. But What I do claim as new, and desire to secure by Letters Patent, is:—

1. The employment or use of the radius guide, E, constructed, arranged, and applied to the saw, B, substantially as herein shown and described, for the purpose of controlling the same, and preventing any tremor thereof.

2. I claim placing the feed rollers, F, F, G, G, in a movable or sliding frame, H, constructed and arranged as herein set forth, for the purpose of gauging the stuff to be sawed, and properly presenting said stuff to the saw, and guiding it while being sawed.

JOHN J. SQUIRE.

Witnesses:
ALBERT S. NIPPER,
JOHN W. PECK.